United States Patent [19]
Williams et al.

[11] 3,840,274
[45] Oct. 8, 1974

[54] PNEUMATIC ARTICLE CONVEYING SYSTEM

[75] Inventors: Byron E. Williams, Rochester; Richard V. Clements, Pittsford, both of N.Y.

[73] Assignee: Eastman Kodak Company, Rochester, N.Y.

[22] Filed: Nov. 2, 1972

[21] Appl. No.: 303,173

[52] U.S. Cl............ 302/2 R, 243/8, 243/14, 243/25
[51] Int. Cl............ B65g 51/16
[58] Field of Search............ 243/3, 6, 8, 11, 19, 21, 243/22, 25–27, 36, 14; 302/2 R

[56] References Cited
UNITED STATES PATENTS

| | | | |
|---|---|---|---|
| 899,599 | 9/1908 | Jennings | 243/26 |
| 1,180,604 | 4/1916 | Perrine | 243/14 |
| 3,148,845 | 9/1964 | Buchwald | 243/2 |
| 3,305,191 | 2/1967 | Buchwald | 243/4 |
| 3,556,603 | 1/1971 | Liebenberg | 243/2 X |

FOREIGN PATENTS OR APPLICATIONS

| | | | |
|---|---|---|---|
| 1,183,443 | 12/1964 | Germany | 243/2 |
| 1,152,647 | 8/1963 | Germany | 243/25 |

*Primary Examiner*—Evon C. Blunk
*Assistant Examiner*—W. Scott Carson
*Attorney, Agent, or Firm*—S. W. Gremban

[57] ABSTRACT

An article conveying system for pneumatically conveying an article by a timed pulse of compressed air. The conveying system comprises main and branch tubes provided at their junction with a flap valve movable by gravity to a normal position in which it bridges the branch tube outlet to permit unobstructed passage of an article thereby. The flap valve is movable by a pulse of compressed air directed along the branch tube to a second position in which it blocks a portion of the main tube to prevent air from going through the main tube in the wrong direction and to prevent entry of a succeeding article. Following movement of the flap valve to its second position, the pulse of compressed air transports the article along another portion of the main tube.

2 Claims, 9 Drawing Figures

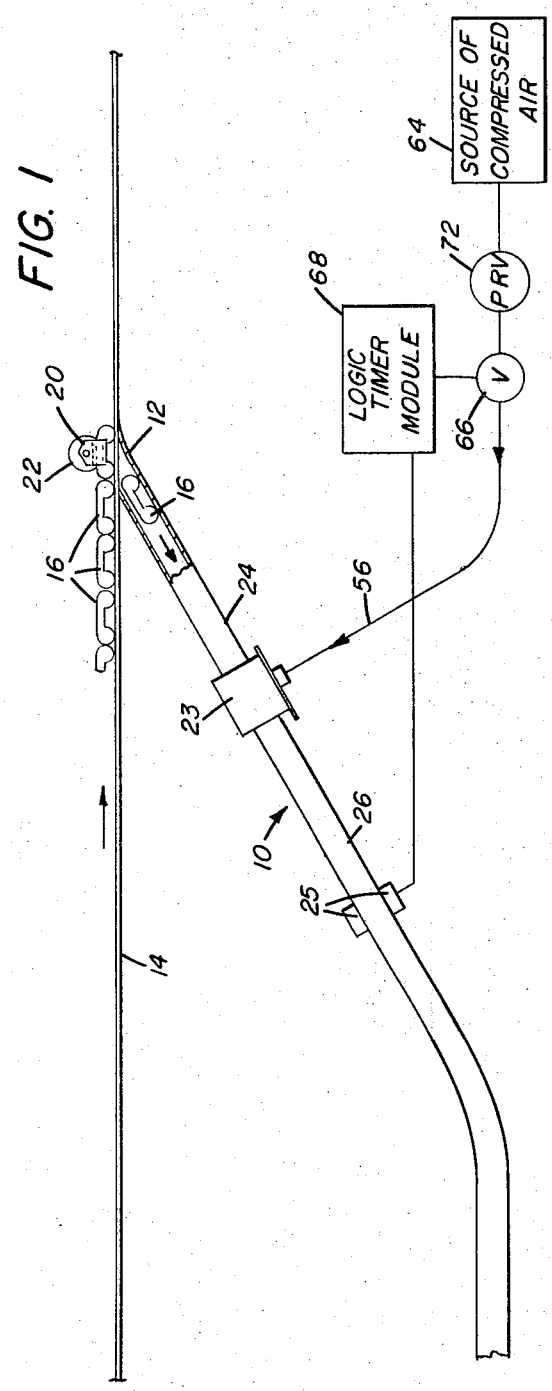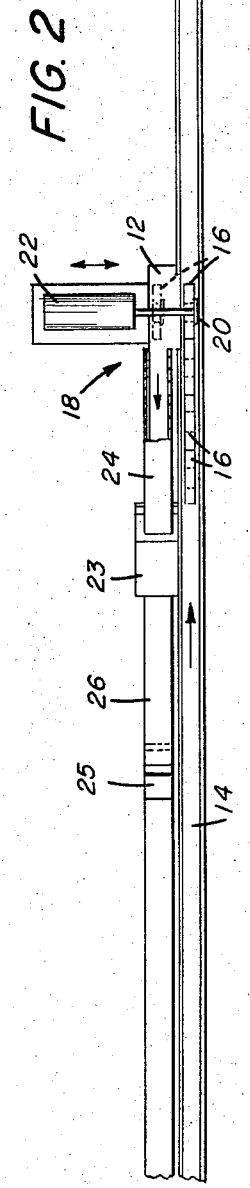

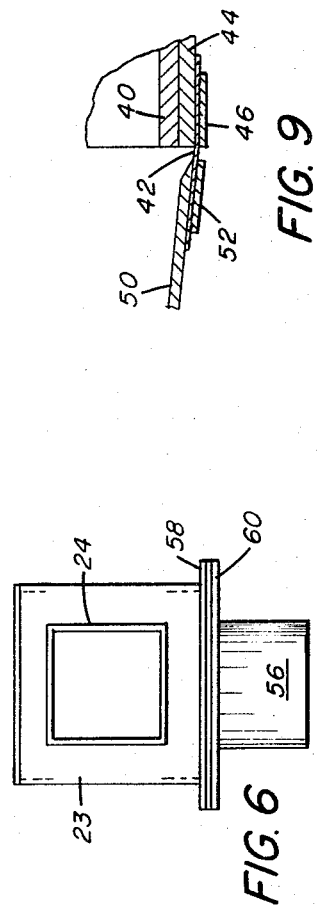
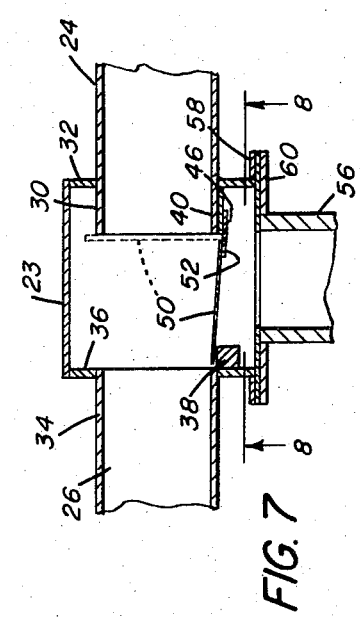
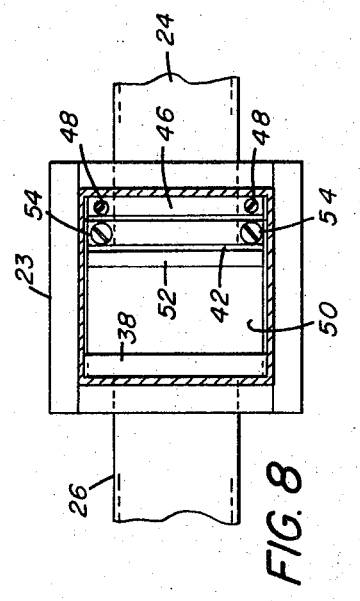
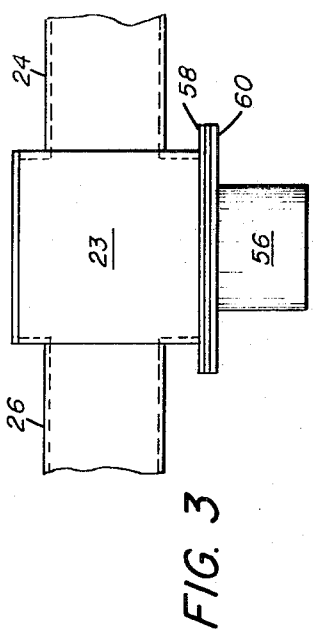
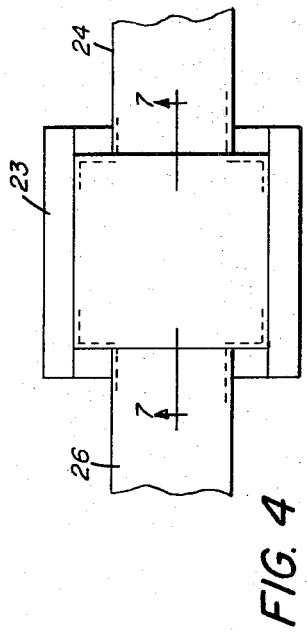
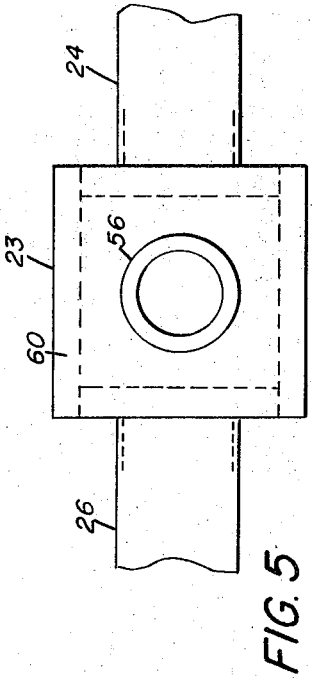

3,840,274

PNEUMATIC ARTICLE CONVEYING SYSTEM

BACKGROUND OF THE INVENTION

1. Field of the Invention

This invention relates generally to article conveying systems, and more specifically to an improved pneumatic article conveying system.

2. Description of the Prior Art

Pneumatic article conveying systems are generally well known in the art as exemplified by conveying systems described in U.S. Pat. Nos. 3,148,845 and 3,305,191. Although such conveying systems operate satisfactorily, they suffer from a disadvantage of being bulky, expensive to purchase and costly to install. In addition, such systems would require modification to successfully convey light fragile objects, particularly for applications requiring low frequency or intermittent conveying of such objects.

SUMMARY OF THE INVENTION

In accordance with a preferred embodiment of the invention, a pneumatic article conveying system is disclosed for conveying an object by a timed pulse of compressed air. The pneumatic conveying system comprises a main tube having leading and trailing portions along which an article is conveyed, and a branch tube pneumatically connected thereto at the junction of such portions. A flap valve is provided at such junction of the main and branch tubes and is movable between a normal first position in which it bridges the outlet of the branch tube to permit unobstructed passage of an article past the outlet, and a second position in which it blocks the leading portion of the main tube to prevent air from entering the leading portion and succeeding articles from entering the trailing portion. Sensing means adjacent the trailing portion of the main tube located downstream of the flap valve sense the presence of an article passing thereby, and respond thereto energizing a logic module coupled to a branch valve for sending a pulse of compressed air through the branch tube. The pulse of air sequentially moves the flap valve to its second position and transports the article along the trailing portion of the main tube to a work station or the like. The distance the article is conveyed along the main tube is a function of several factors such as the weight of the article, tube material, and time duration and pressure of the pulse.

In a more specific modification of the invention, the main tube is inclined at an angle to the horizontal, and the flap valve is hingedly mounted to a junction surface of the main and branch tubes. Accordingly, the flap valve is moved to its normal first position by the force of gravity.

One of the primary advantages of the pneumatic conveying system of this invention is that it is relatively inexpensive to construct and install, and is very compact, utilizing a minimum of space.

One of the objects of the present invention is to provide an improved pneumatic conveying system that is of simple design and construction, thoroughly reliable and efficient in operation, and economical to manufacture and install.

Another object of the invention is to provide an improved pneumatic conveying system that is particularly suitable for low frequency or intermittent conveying of articles.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a schematic side elevational view of the pneumatic conveying system of this invention;

FIG. 2 is a segmental top plan view of a portion of the conveying system of FIG. 1;

FIG. 3 is an enlarged segmental view of a valve portion of the system of FIG. 1;

FIG 4 is a segmental top plan view of the valve of FIG. 3;

FIG. 5 is a segmental bottom view of the valve of FIG. 3;

FIG. 6 is a side elevational view of the valve of FIG. 3;

FIG. 7 is a section view taken substantially along line 7—7 of FIG. 4;

FIG. 8 is a section view taken substantially along line 8—8 of FIG. 7; and

FIG. 9 is an enlarged segmental view of a hinge portion of the valve of FIG. 7.

DESCRIPTION OF THE PREFERRED EMBODIMENT

Because article conveying systems are generally well known, the present description will be directed in particular to elements forming part of, or cooperating more directly with, apparatus in accordance with the present invention. Conveyor elements, valves and logic systems not specifically shown or described herein should be understood to be selectable from those known in the art.

With reference to FIG. 1 of the drawings, a preferred embodiment of the article conveying system of this invention is disclosed comprising a main tube 10 supported by any suitable means, not shown, at any suitable angle such as 45° with the horizontal. The tube 10 is preferably of any suitable cross section that approximates that of the article such as a square cross section, and constructed of any suitable material such as stainless steel or the like. The upper outlet or open end 12 of tube 10 is arranged adjacent any suitable belt conveyor 14 or the like along which articles such as film cartridges 16 are conveyed continuously in step-by-step fashion. A wiping mechanism 18 of any suitable type such as a depending arm 20 reciprocally movable by an air cylinder 22 is provided adjacent tube end 16 for wiping a cartridge 16 from conveyor 14 into or in register with the open end 12 of tube 10. Due to the inclination of tube 10, cartridge 16 falls by gravity down the tube through a normally open cubiform valve housing 23 and past a photocell sensor 25 which activates the rest of the conveying cycle in a manner to be explained hereinafter, and transports the cartridge through the tube to a remote inspection station, not shown.

As best illustrated in FIG. 7, the inclined portion of main tube 10 is formed from leading and trailing sections 24, 26 respectively coupled together by housing 23. One end 30 of leading portion 24 extends through a side wall 32 of housing 23, and an end 34 of trailing portion 26 is flush with the opposite side wall 36 of housing 23. A bar-like valve seat 38 of rectangular cross section is secured to side wall 36 adjacent end 34 of portion 26. A lower wall 40 of end 30 forms a seat for one end of a substantially rectangular hinge sheet 42 of polyethylene or other suitable material sandwiched between two plates 44, 46 secured to wall 40 by screws 48 or the like as best seen in FIGS. 8 and 9. The opposite end of hinge sheet 42 is sandwiched between one end of a substantially rectangular flap valve 50 and a clamp plate 52 secured together by screws 54. The flap valve 50 may be constructed of any suitable material such as stainless steel or the like. Due to the inclination of main tube 10, the force of gravity acting on flap valve 50 retains the valve in its normal first position as seen in full lines in FIG. 7 in which it bridges the outlet of branch tube 56. The flap valve 50 is movable from its normal position to a second position as seen dotted in FIG. 7 by a timed pulse of compressed air provided by means now to be explained.

The lower end of valve housing 23 is provided with a peripheral rim 58, and a peripheral rim 60 mounted on the end of branch tube 56 is secured thereto by screws with any suitable gasket 62 interposed therebetween. The opposite end of branch tube 56 is connected to any suitable source of compressed air 64, and a solenoid operated branch valve 66 is interposed in tube 56 for supplying, when energized, a timed pulse of compressed air to valve housing 23. The energization of branch valve 66 is controlled by any suitable commercially available logic timer module 68 for opening valve 66 for a predetermined time duration to provide a timed pulse or burst of compressed air to valve housing 23. The logic timer module 68 is responsive to a sensing means of any suitable type such as the aforementioned photocell sensor 25 mounted adjacent the trailing portion 26 of main tube 10 and arranged to sense an article as it is transported down the main tube under the influence of gravity. The photocell sensor 25 can be of any suitable type comprising a light source on one side of tube 10 for directing a light through diametrically opposed openings in the tube, and a light sensitive cell on the opposite side of the tube for sensing the light. When the light is blocked by an article 16 passing through the tube, sensor 25 actuates the logic timer module 68 which sends a signal to valve 66. The valve 66 supplies a pulse of compressed air to valve housing 23 which initially moves flap valve 50 from its normal first position to its second position, blocking the leading portion 24 of main tube 10 to prevent air from entering the leading portion and to prevent a succeeding article 16 from entering housing 28. The pulse of air which is trapped between the article and flap valve 50 creates a force which transports the article along tube 10 to any suitable destination point such as an inspection station or the like, not shown. The distance that the article 16 is conveyed along main tube 10 depends, among other things, on the length of the pulse and the pressure. For the particular application described, pulses from 1 to 3 seconds were found satisfactory at a pressure of 12 psi regulated by a pressure regulator valve 72 interposed in branch tube 56 between the source of compressed air 64 and branch valve 66. However, the time duration and pressure selected is variable depending upon such factors as the size and length of tube, the weight of the article and the distance the article is to be transported. When the pulse of air ceases, flap valve 50 returns by gravity to its normal position allowing the next succeeding article 16 to be transported by gravity through valve housing 28 and sensing means 25.

The invention has been described in detail with particular reference to a preferred embodiment thereof, but it will be understood that variations and modifications can be effected within the spirit and scope of the invention as described hereinabove.

What is claimed is:

1. In a pneumatic conveying apparatus, the combination comprising:
   a main tube inclined relative to the horizontal and having leading and trailing portions along which an article is conveyed;
   a cubiform valve housing interconnecting adjacent ends of said leading and trailing tube portions;
   a branch tube pneumatically connected to said valve housing;
   a valve seat arranged within said valve housing adjacent said end of said trailing tube portion;
   a mounting wall surface provided within said housing on said end of said leading tube portion;
   valve means within said valve housing comprising a rectangular flap movable from a normal first position in which it permits unobstructed passage of an article past said branch tube, to a second position in which it prevents passage of air into said leading portion and entry of a succeeding article into said trailing portion, said flap having one end hingedly secured to said wall surface and its free end adapted under the influence of gravity to engage said valve seat and bridge said branch tube in said normal first position of said flap;
   means on said trailing portion for sensing a leading article transported past said valve flap in said normal position; and
   means responsive to said sensing means comprising air pulse generating means for generating pulses of air of a predetermined time duration and pressure for sequentially moving said valve flap to said second position, and for transporting said leading article along said trailing portion of said main tube.

2. The invention according to claim 1 wherein said flap is formed of stainless steel, and is hingedly secured to said wall surface by a strip of polyethylene.

* * * * *